(12) United States Patent
Dierksmeier

(10) Patent No.: US 11,085,373 B2
(45) Date of Patent: Aug. 10, 2021

(54) GAS TURBINE ENGINE WITH MOUNT FOR INTERCHANGEABLE INLETS

(71) Applicant: Rolls-Royce North American Technologies Inc., Indianapolis, IN (US)

(72) Inventor: Douglas D. Dierksmeier, Franklin, IN (US)

(73) Assignee: Rolls-Royce North American Technologies Inc., Indianapolis, IN (US)

( * ) Notice: Subject to any disclaimer, the term of this patent is extended or adjusted under 35 U.S.C. 154(b) by 239 days.

(21) Appl. No.: 16/263,746

(22) Filed: Jan. 31, 2019

(65) Prior Publication Data

US 2020/0248621 A1 Aug. 6, 2020

(51) Int. Cl.
*F02C 7/04* (2006.01)
*F01D 25/24* (2006.01)

(52) U.S. Cl.
CPC .............. *F02C 7/04* (2013.01); *F01D 25/243* (2013.01); *F05D 2240/14* (2013.01); *F05D 2260/30* (2013.01); *F05D 2260/31* (2013.01); *F05D 2260/39* (2013.01)

(58) Field of Classification Search
CPC .... F02C 7/04; F02C 7/05; F02C 7/052; F01D 25/246; F05D 2230/51; F05D 2230/60; F05D 2230/61; F05D 2230/644; F05D 2230/70; F05D 2230/80; F05D 2260/30; F05D 2260/31; F05D 2260/36; F05D 2260/39; F05D 2230/72; F02K 3/06; B64D 29/06; B64D 29/08; B64C 7/02
See application file for complete search history.

(56) References Cited

U.S. PATENT DOCUMENTS

| | | | |
|---|---|---|---|
| 4,685,942 A | 8/1987 | Klassen et al. | |
| 6,360,989 B1 | 3/2002 | Maguire | |
| 7,887,610 B2 | 2/2011 | Pavlatos | |
| 8,186,946 B2* | 5/2012 | Parkos, Jr. ............. | C25D 15/02 415/173.4 |
| 8,539,748 B2 | 9/2013 | Petrowicz et al. | |
| 8,720,028 B2 | 5/2014 | Singh et al. | |
| 8,740,137 B2 | 6/2014 | Vauchel et al. | |
| 9,169,026 B2 | 10/2015 | Joret et al. | |
| 9,969,499 B2* | 5/2018 | Caruel ..................... | F02C 7/04 |
| 9,972,896 B2* | 5/2018 | Bulumulla ................ | B64F 5/60 |
| 10,364,752 B2* | 7/2019 | Moniz ................... | F04D 29/522 |
| 10,589,869 B2* | 3/2020 | Wittman ................ | B64D 29/00 |
| 10,676,203 B2* | 6/2020 | Porte ........................ | F02C 7/04 |
| 10,683,806 B2* | 6/2020 | Moniz ....................... | F02C 7/05 |
| 2009/0324404 A1* | 12/2009 | Maier ................... | F04D 29/624 415/214.1 |
| 2014/0260127 A1 | 9/2014 | Boyce | |
| 2016/0177823 A1 | 6/2016 | Younes et al. | |
| 2020/0063606 A1* | 2/2020 | Miller ................... | B64D 27/02 |

* cited by examiner

*Primary Examiner* — Craig Kim
*Assistant Examiner* — Stephanie Sebasco Cheng
(74) *Attorney, Agent, or Firm* — Barnes & Thornburg LLP

(57) ABSTRACT

A gas turbine engine includes an engine unit and an inlet. The engine unit includes an engine core that includes a compressor, a combustor, and a turbine and a nacelle arranged circumferentially around at least a portion of the engine core. The inlet is removably coupled with the nacelle and configured to conduct fluid into the engine unit. The inlet includes a nose and an intake lip arranged circumferentially around the nose to define an intake passage that extends through the inlet.

14 Claims, 6 Drawing Sheets

GAS TURBINE ENGINE WITH MOUNT FOR INTERCHANGEABLE INLETS

STATEMENT REGARDING FEDERALLY SPONSORED RESEARCH OR DEVELOPMENT

Embodiments of the present disclosure were made with government support under Contract No. W911W6-15-2-0005. The government may have certain rights.

FIELD OF THE DISCLOSURE

The present disclosure relates generally to gas turbine engines, and more specifically to inlets of gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Air is drawn into the engine through an air inlet and communicated to the compressor via an air-inlet duct. In some operating conditions, particles, such as dust, sand, or liquid water, may be entrained in the air and may be drawn into the air inlet and conducted to the compressor. Such particles may impact components of the compressor and the turbine causing unintended wear. This unintended wear may decrease power output of the engine, shorten the life span of the engine, and lead to increased maintenance costs and increase down time of the engine.

One method of separating particles from the air entering the compressor has been by inertial particles separators integrated with the air inlet. Even still, inertial particles separators may add weight to the gas turbine engine and reduce air flow to the compressor in clean air conditions where little or no particles are present in the air.

SUMMARY

The present disclosure may comprise one or more of the following features and combinations thereof.

A gas turbine engine may include an engine unit, an inlet, and a mount system. The engine unit may include an engine core. The engine core may include a compressor, a combustor, a turbine, a core duct, and a nacelle. The compressor, combustor, and turbine may be arranged along an axis. The core duct may be coupled with the compressor and formed to define a core channel. The core channel may be configured to receive fluid and conduct the fluid to the compressor. The nacelle may be arranged circumferentially relative to the axis around at least the compressor. The nacelle may include a nacelle coupler located at a fore end of the nacelle.

In some embodiments, the inlet may be removably coupled with the nacelle and configured to conduct fluid into the core duct of the engine unit. The inlet may include a nose and an intake lip. The intake lip may be arranged circumferentially around the nose to define an intake passage. The intake passage may extend axially through the inlet and be fluidly connected with the core channel. The intake lip may include an inlet coupler located at an aft end of the inlet.

In some embodiments, the mount system may removably couple the inlet with the nacelle to allow the inlet to be removed and replaced with a differently shaped inlet. The mount system may include a coupler segment, a first fastener, and a second fastener. The coupler segment may overlap axially a portion of the intake lip of the inlet and the nacelle. The first fastener may extend radially through the coupler segment and the inlet coupler. The second fastener may extend radially through the coupler segment and the nacelle coupler such that the first fastener and the second fastener are removable and accessible from radially outside the gas turbine engine.

In some embodiments, the inlet coupler may include an axially extending band and a ramp. The ramp may extend radially outward away from the band of the inlet coupler. The nacelle coupler may include an axially extending band and a ramp. The ramp may extend radially outward away from the band of the nacelle coupler. The coupler segment may include tapered walls that define a cavity that extends radially outward into the coupler segment. The ramp of the inlet coupler and the ramp of the nacelle coupler may be located in the cavity. A radial clamping force applied to the inlet coupler, the nacelle coupler, and the coupler segment from the first fastener and the second fastener may cause the tapered walls of the coupler segment to engage the ramp of the inlet coupler and the ramp of the nacelle coupler. A portion of the radial clamping force may be redirected to an axial direction and may urge the inlet axially toward the nacelle.

In some embodiments, the inlet coupler may abut the nacelle coupler in the axial direction without overlapping the nacelle coupler in a radial direction. The inlet may include a radially outermost surface located at the aft end of the inlet. The nacelle may include a radially outermost surface located at the fore end of the nacelle. The coupler segment may include a radially outermost surface that is flush with the radial outermost surface of the inlet and the radial outermost surface of the nacelle.

In some embodiments, the coupler segment may be formed to include at least one of a plurality of counter bores and a plurality of countersinks. The counter bores and countersinks may extend radially inward into the radial outermost surface of the coupler segment. The counter bores and countersinks may receive the first fastener and the second fastener.

In some embodiments, the engine unit may include a scavenge duct. The scavenge duct may define a scavenge channel configured to bypass fluid around the engine core. The scavenge channel may include a scavenge inlet and a scavenge outlet located downstream of the scavenge inlet. The intake lip may be arranged around the scavenge inlet to block access to the scavenge inlet.

In some embodiments, the engine unit may include a scavenge duct that defines a scavenge channel configured to bypass fluid around the compressor. The inlet may include a splitter located radially between the intake lip and the nose. The splitter may be configured to separate a mixture of air and particles into a clean flow substantially free of particles and a dirty flow containing the particles. The splitter may direct the clean flow toward the core channel and the dirty flow toward the scavenge channel.

In some embodiments, the engine core may include a gearbox coupled with the turbine. The gearbox may be located axially forward of the compressor. The nose of the inlet may be arranged to cover at least a portion of the gearbox. The core duct may include an inlet opening that is located radially outward of the gearbox. The nose of the inlet may include a concave forward section and an aft section. The aft section may include a concave portion coupled to the concave forward section at an apex ring of the nose. The apex ring of the nose may be located along the nose at a furthest radial distance from the axis. The aft section may include a radially innermost point. The radially innermost point may be located at a further radial distance from the axis than a radially outermost point of the gearbox.

In some embodiments, the intake lip may include a fore end and an aft end spaced apart axially from the fore end. The intake lip may be formed to define a cutout. The cut out may extend axially at least partway into the aft end of the intake lip toward the fore end. The cutout may be sized to receive a fairing. The fairing may house torque-transmitter shafts coupled with the gearbox.

According to another aspect of the present disclosure, a gas turbine engine may include an engine unit and an inlet. The engine unit may include an engine core. The engine core may include a compressor, a combustor, a turbine, a core duct, a scavenge duct, and a nacelle. The core duct may be coupled with the compressor and formed to define a core channel. The core channel may be configured to conduct fluid to the compressor. The scavenge duct may be configure to bypass fluid around the engine core. The nacelle may be arranged circumferentially around the compressor and the scavenge duct relative to an axis.

In some embodiments, the inlet may be removably coupled with the nacelle and formed to include an intake lip arranged circumferentially around the axis. The intake lip may define an intake passage that extends axially through the inlet. The intake passage may be fluidly connected with the core channel. The scavenge duct may include a scavenge inlet and a scavenge outlet located downstream of the scavenge inlet. The intake lip may be arranged around the scavenge inlet to block access to the scavenge inlet.

In some embodiments, the gas turbine engine may comprise a mount system. The mount system may include a coupler segment, a first fastener, and a second fastener. The coupler segment may overlap axially a portion of the nacelle and a portion of the intake lip of the inlet. The first fastener may extend radially through the coupler segment and the intake lip. The second fastener may extend radially through the coupler segment and the nacelle.

In some embodiments, the inlet may include an axially extending band and a ramp. The ramp may extend radially outward away from the band of the inlet. The nacelle may include an axially extending band and a ramp. The ramp may extend radially outward away from the band of the nacelle. The coupler segment may include tapered walls that define a cavity. The cavity may extend radially outward into the coupler segment. The ramp of the inlet and the ramp of the nacelle may be located in the cavity.

In some embodiments, the engine core may include a gearbox coupled with the turbine and located axially forward of the compressor. The inlet may include a nose that engages the core duct. The nose of the inlet may be sized to translate axially in an aft direction over the gearbox to engage the core duct.

According to another aspect of the present disclosure, a method may include providing an engine unit including a nacelle, coupling a first inlet with the nacelle, removing the first inlet from the nacelle, and coupling a second inlet with the nacelle. The second inlet may be of a different shape than the first inlet. The engine unit may include an engine core. The engine core may include a compressor, a combustor, a turbine, and a core duct. The compressor, combustor, and turbine may be arranged along an axis. The core duct may be coupled with the compressor. The nacelle may be arranged circumferentially relative to the axis around at least the compressor. The first inlet may include a nose and an intake lip arranged circumferentially around the nose. The intake lip may define an intake passage that extends axially through the inlet.

In some embodiments, coupling the first inlet with the nacelle may include positioning a coupler segment of a mount system relative to the first inlet and the nacelle. The coupler segment may overlap axially a portion of the inlet and a portion of the nacelle. Coupling the first inlet with the nacelle may include inserting a first fastener of the mount system radially through the coupler segment to couple the coupler segment to the inlet. Coupling the first inlet with the nacelle may include inserting a first fastener of the mount system radially through inlet coupler located at an aft end of the inlet to couple the coupler segment to the inlet.

In some embodiments, coupling the first inlet with the nacelle may include inserting a second fastener of the mount system radially through the coupler segment to couple the coupler segment to the nacelle. Coupling the first inlet with the nacelle may include inserting a second fastener of the mount system radially through a nacelle coupler located at a fore end of the nacelle to couple the coupler segment to the nacelle.

In some embodiments, removing the first inlet from the nacelle may include accessing the first fastener from radially outside the engine unit. Removing the first inlet from the nacelle may include removing the first fastener from the coupler segment and the inlet coupler. Removing the first inlet from the nacelle may include accessing the second fastener from radially outside the engine unit. Removing the first inlet from the nacelle may include removing the second fastener from the coupler segment and the nacelle.

In some embodiments, the engine core may include a gearbox coupled with the turbine. The gearbox may be located axially forward of the compressor and radially inward of the core duct. Coupling the first inlet with the nacelle may include sliding the nose of the first inlet axially aft over the gearbox of the engine core toward the nacelle. The engine core may include a scavenge duct that defines a scavenge channel. The scavenge channel may be configured to bypass fluid around the compressor. The scavenge duct may include a scavenge inlet and a scavenge outlet located downstream of the scavenge inlet. Coupling the first inlet with the nacelle may include positioning the intake lip of the first inlet around the scavenge inlet to block access to the scavenge inlet.

DETAILED DESCRIPTION OF THE DRAWINGS

Figure 1:
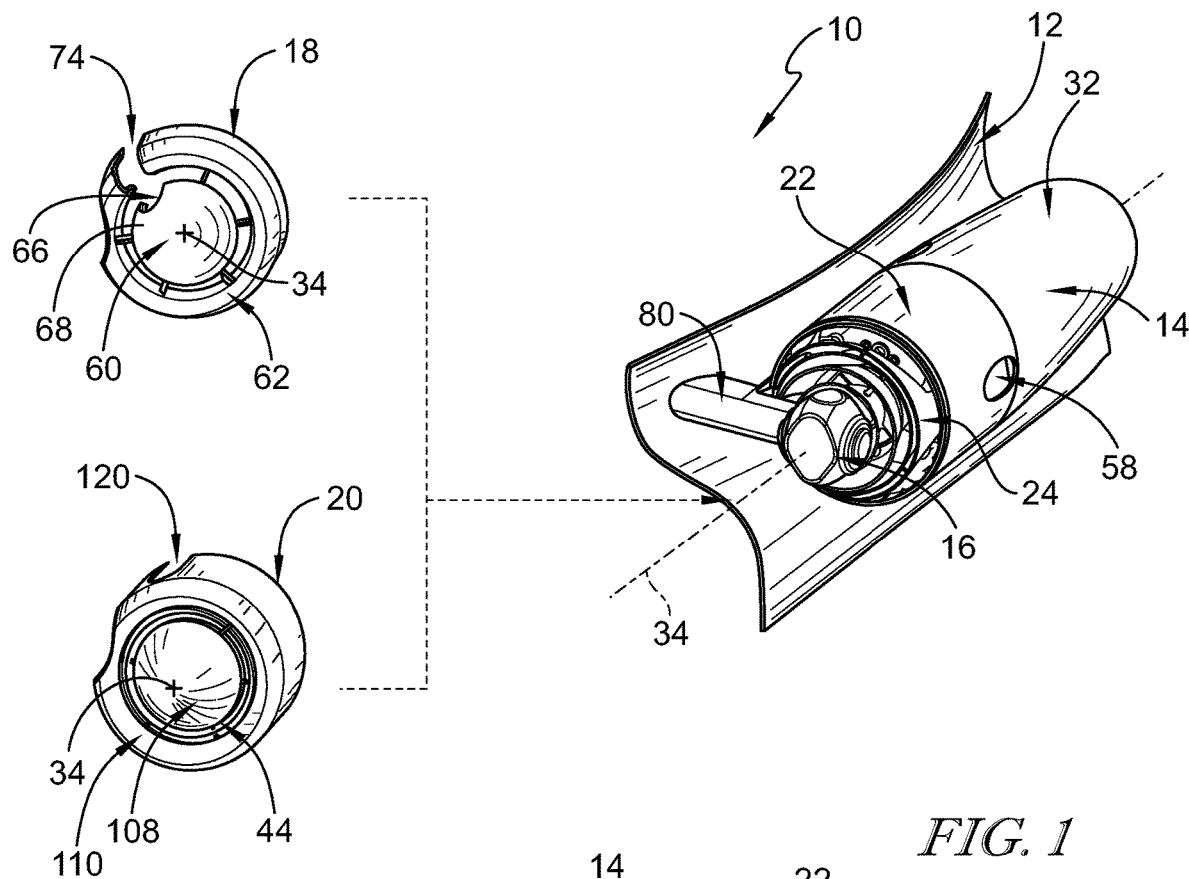
FIG. 1 is a cut-away perspective view of a gas turbine engine in accordance with the present disclosure having an engine unit coupled to an airframe shown at the right, a first inlet shown at the upper left, and a second inlet having a particle separator shown at the lower left, each inlet being configured to removably couple with a nacelle of the engine unit such that the inlets are interchangeable depending on expected flight conditions.

For the purposes of promoting an understanding of the principles of the disclosure, reference will now be made to a number of illustrative embodiments illustrated in the drawings and specific language will be used to describe the same.

A gas turbine engine 14 in accordance with the present disclosure includes an engine unit 22, a first inlet 18 or a second inlet 20, and a mount system 36 configured to removably couple the first inlet 18 or the second inlet 20 with the gas turbine engine 14 so that the inlets 18, 20 are interchangeable based on expedited flight conditions as suggested in FIG. 1. The first inlet 18 is illustratively formed without a particle separator and may be used when flight conditions are expected to comprise air substantially free of particles in the air. The second inlet 20 is illustratively formed to include a particle separator and may be used when flight conditions are expected to comprise air with particles in the air. The mount system 36 is accessible from radially outside the gas turbine engine 14 as suggested in FIGS. 5 and 6 so that inlets 18, 20 may be removed and replaced efficiently.

The gas turbine engine 14 is adapted for use with an aircraft 10 as suggested in FIG. 1. The aircraft 10 includes an airframe 12 and the gas turbine engine 14. The airframe 12 is configured to support a pilot and, in some embodiments, passengers therein. In some embodiments, the aircraft 10 and, thus, the airframe 12 is unmanned. The gas turbine engine 14 is coupled with the airframe 12 for movement therewith and is configured to generate power that is provided to a propulsion unit such as rotors or a propeller via a gearbox 16.

The gas turbine engine 14 includes the engine unit 22, the first inlet 18 or the second inlet 20, and the mount system 36 as shown in FIG. 1. The engine unit 22 includes an engine core 24 and a nacelle 32. The engine core includes a compressor 26, a combustor 28, and a turbine 30. The nacelle 32 surrounds at least a portion of the engine core 24. Illustratively, the nacelle 32 surrounds circumferentially at least the compressor 26, as shown in FIGS. 1 and 2.

Figure 2:
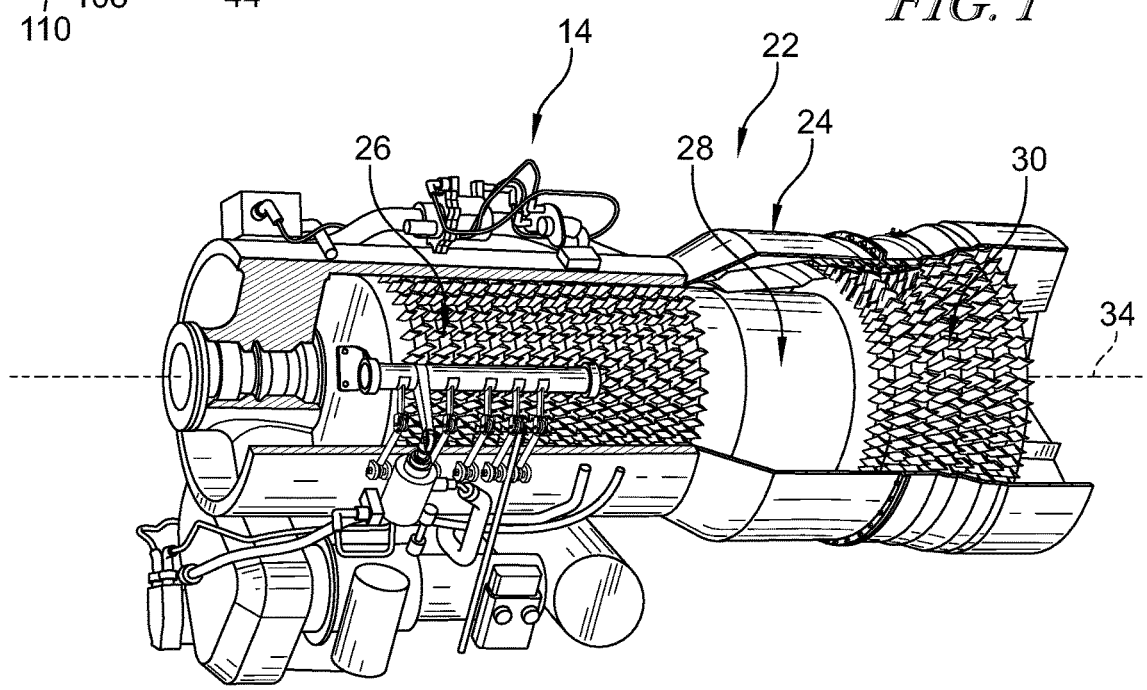
FIG. 2 is a cut away perspective view of the engine unit of FIG. 1 showing that the engine unit includes an engine core having a compressor, a combustor, and a turbine.

The compressor 26, the combustor 28, the turbine 30, and the nacelle 32 are each arranged along an axis 34, as shown in FIGS. 1 and 2. The compressor 26 compresses air drawn into the gas turbine engine 14 and delivers high-pressure air to the combustor 28. The combustor 28 ignites a mixture of the compressed air and fuel. Products of the combustion process are directed into the turbine 30 where work is extracted to drive the compressor 26 and provide power to the gearbox 16.

Figure 4:
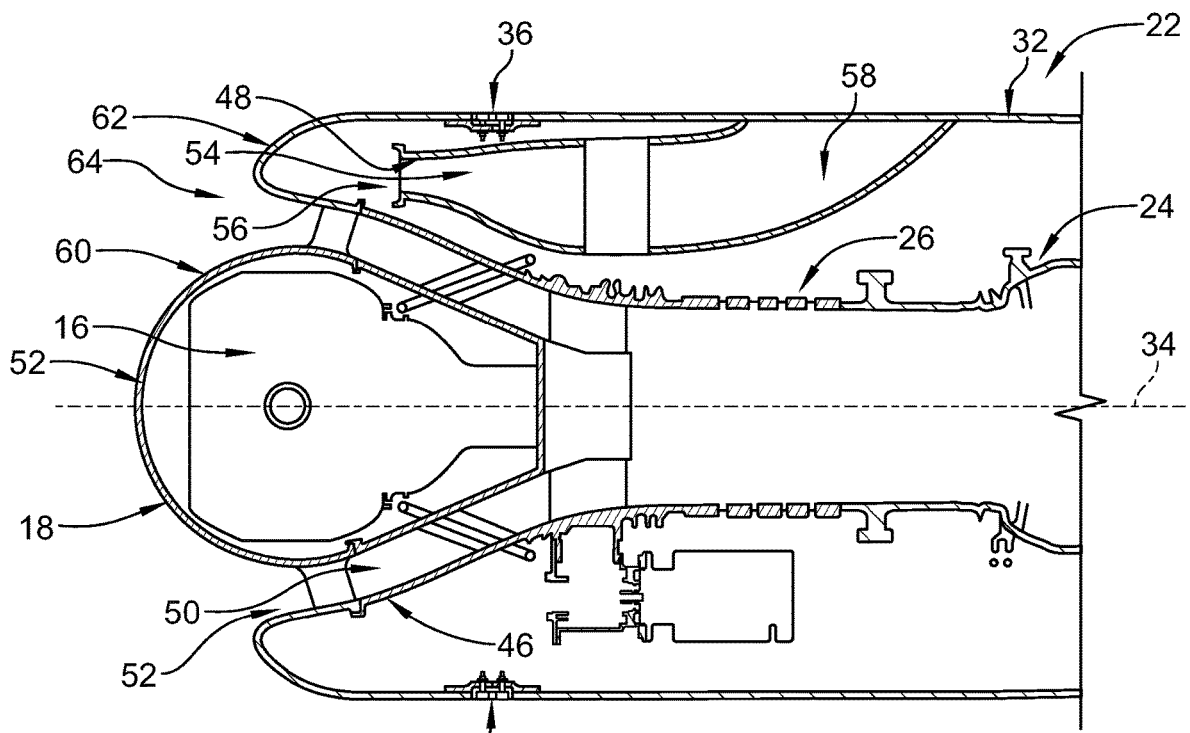
FIG. 4 is a section view of the engine unit of FIG. 3 and the first inlet removably coupled with the engine unit via a mount system showing that the inlet includes a nose arranged around the gearbox, an intake passageway that conducts air into the core duct of the engine unit, and an intake lip that covers and blocks access to the scavenge duct.

Air is drawn into the gas turbine engine 14 through the inlet 18 or the inlet 20 prior to admission of the air into the compressor 26, as suggested by FIGS. 1, 2, and 4. Each inlet 18, 20 is removably couplable to the nacelle 32 via the mount system 36 of the gas turbine engine 14 as suggested in FIGS. 6, 7, and 11.

Figure 3:
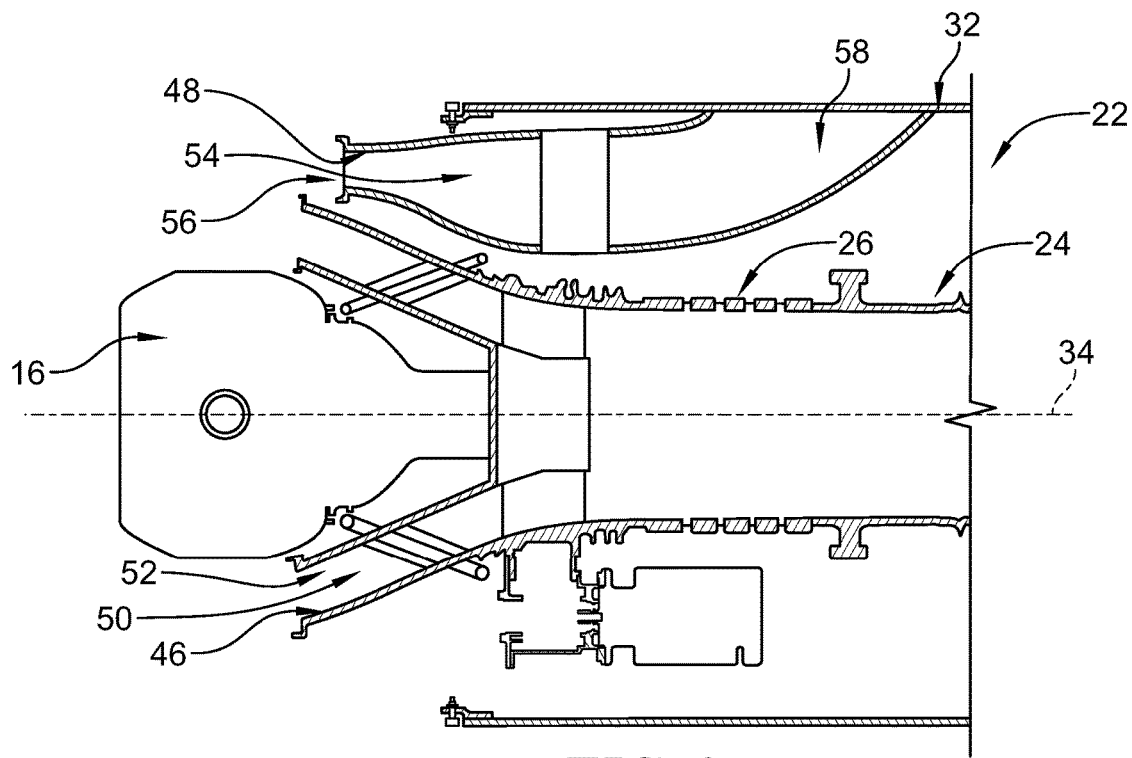
FIG. 3 is a section view of the engine unit of FIG. 1 showing that the engine unit includes a gearbox at its fore end, a core duct configured to conduct fluid around the gearbox and to the compressor, and a scavenge duct arranged radially outside the core duct and configured to bypass fluid around the compressor.

The engine unit 22 includes the engine core 24, the nacelle 32, and further includes a core duct 46 and a scavenge duct 48 as shown in FIG. 3. The core duct 46 is coupled with the compressor 26 and defines a core channel 50 configured to receive fluid and conduct the fluid to the compressor 26. The core duct 46 includes a core duct inlet 52 that is located radially outward of the gearbox 16 as shown in FIG. 3. The scavenge duct 48 defines a scavenge channel 54 configured to bypass air having particles suspended in the air around the compressor 26 and the engine core 24. The scavenge channel 54 includes a scavenge inlet 56 and a scavenge outlet 58 located downstream of the scavenge inlet 56. The scavenge inlet 56 is located radially outward of the gearbox 16. In illustrative embodiments, the scavenge inlet 56 is located radially outward of the core duct inlet 52. The scavenge outlet 58 is configured to direct the scavenge air and particles to atmosphere outside the engine 14. The scavenge outlets 58 may be covered when using the first inlet 18.

Figure 10:
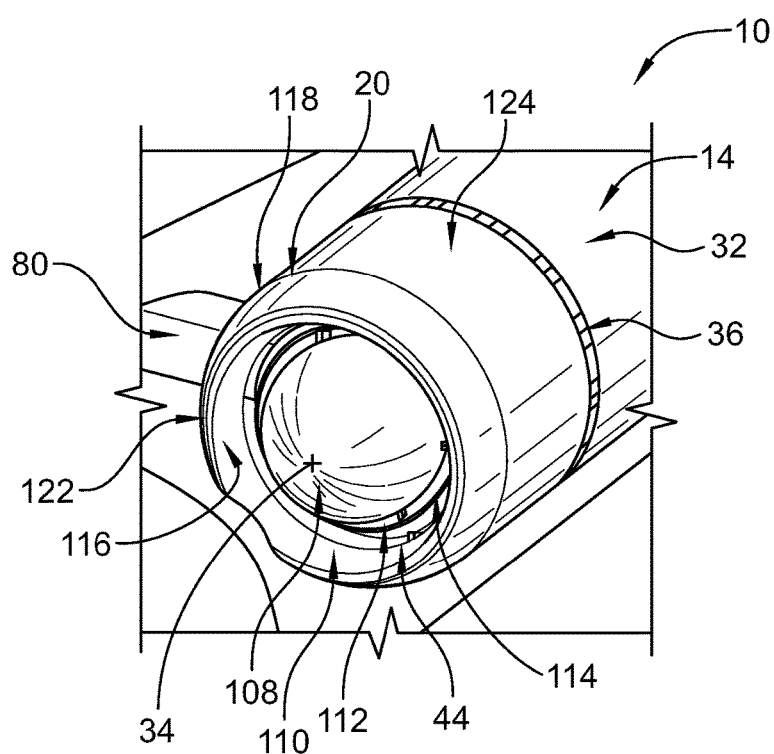
FIG. 10 is a perspective view of the second inlet and the engine unit of FIG. 9 showing that the inlet includes a cutout sized and shaped to receive the fairing that houses the torque-transmission shafts coupled to the gearbox of the engine unit.

In illustrative embodiments, either the first inlet 18 or, alternatively, the second inlet 20 having a particle separator 44 may be coupled to the nacelle 32 via the mount system 36 of the gas turbine engine 14, as suggested in FIG. 1. The mount system 36 is suitable for use with the inlet 18 as shown in FIG. 4 and the inlet 20 as shown in FIG. 10. In this way, the same mount system 36 allows a mechanic or other user to couple one of the first inlet 18 and the second inlet 20 with the nacelle 32, remove the coupled inlet 18, 20 from the nacelle 32, and couple the other of the first inlet 18 and the second inlet 20 with the nacelle 32.

Figure 5:
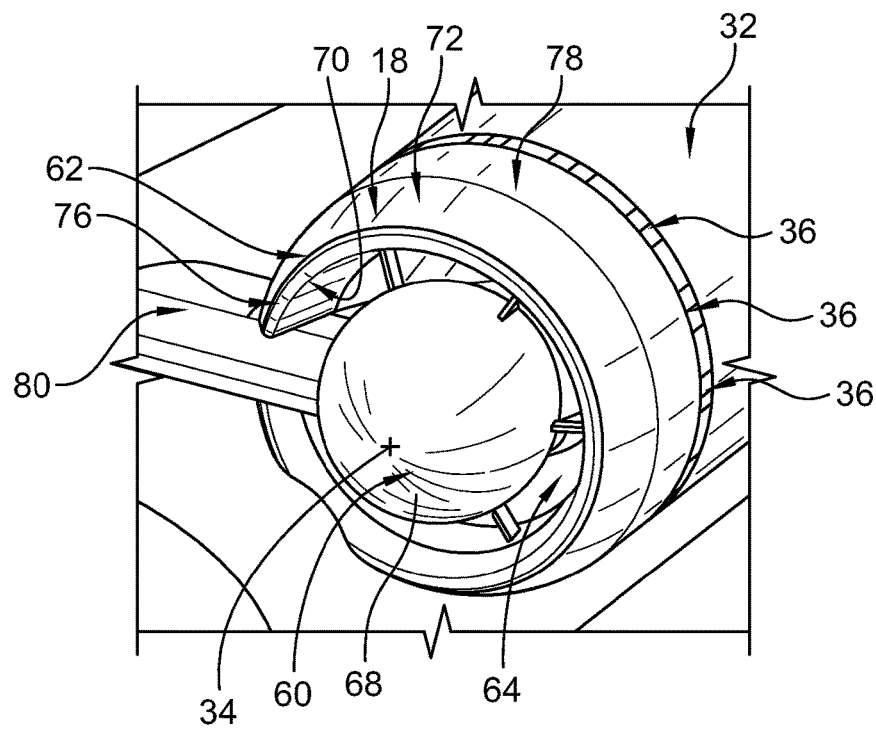
FIG. 5 is a perspective view of the first inlet and the engine unit of FIG. 4 showing that the inlet includes a cutout sized and shaped to receive a fairing of the aircraft that houses torque-transmission shafts which are coupled to the gearbox of the engine unit.

The inlet 18 includes a nose 60 and an intake lip 62 arranged circumferentially and concentrically around the nose 60, as shown in FIGS. 4 and 5. The intake lip 62 is annular or ring shaped, and the nose 60 and the intake lip 62 share a common longitudinal axis 34. The intake lip 62 and the nose 60 cooperate to define an annular intake passage 64 that extends axially through the inlet 18 and is fluidly connected with the core channel 50. The inlet 18 is formed without a particle separator and the intake lip 62 is arranged around the scavenge inlet 56 to block access to the scavenge inlet 56 such that the scavenge inlet 56 and the scavenge channel 54 is inaccessible to air drawn into the gas turbine engine through the inlet 18.

The passage side 70 of the intake lip 62 and a concave aft section 86 of the nose 60 engage the core duct 46 to fluidly connect the intake passage 64 with the core duct 46 as shown in FIG. 4. The passage side 70 of the intake lip 62 and a concave aft section 86 of the nose 60 are not coupled via fasteners or other means to the core duct 46. Instead, the passage side 70 of the intake lip 62 and a concave aft section 86 of the nose 60 are held in contact with the core duct 46 via a clamping force applied by mount system 36. In some embodiments, seals are located between the passage side 70 of the intake lip 62 and a concave aft section 86 of the nose 60 and the core duct 46.

The nose 60 illustratively includes a cutout 66 extending radially inwardly through a portion of a radially outer surface 68 of the nose 60 toward the axis 34 as shown in FIGS. 1 and 5. The intake lip 62 includes a passage side 70, an outer side 72 opposite the passage side 70, and a cutout 74 that extends radially inward through the passage side 70 and through the outer side 72 of the intake lip 62 to receive the fairing 80, as shown in FIGS. 1 and 5.

The intake lip 62 includes a fore end 76 connecting the passage side 70 and the outer side 72, and an aft end 78 spaced apart axially from the fore end 76, as shown in FIG. 5. The cutout 74 extends axially forward through the aft end 78 and through the fore end 76 of the intake lip 62. The cutout 66 of the nose 60 is circumferentially aligned with the cutout 74 of the intake lip 62. Each cutout 66, 74 is sized to receive a fairing 80 that houses torque-transmitter shafts coupled with the gearbox 16. The fairing 80 extends from the airframe 12 through the cutout 66 and through cutout 74 to the gearbox 16.

Figure 6:
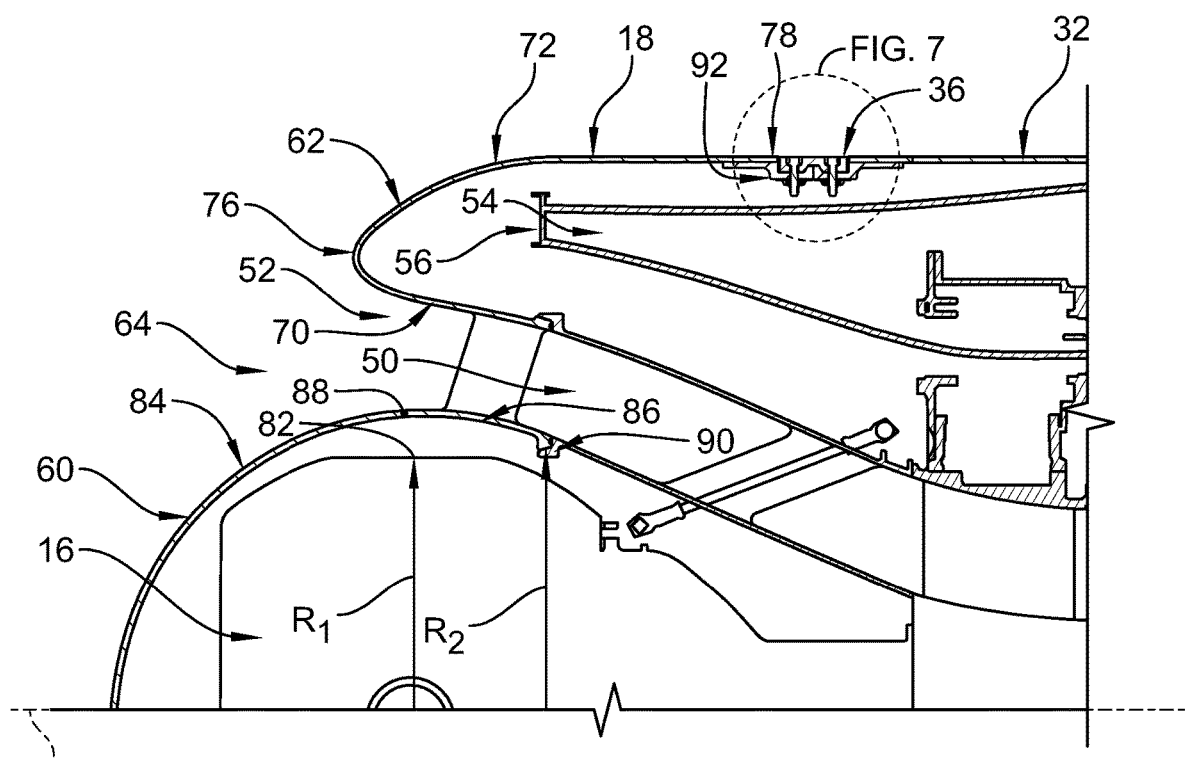
FIG. 6 is an enlarged section view of a portion of the first inlet and the engine unit of FIG. 4 showing that the nose of the inlet is sized and shaped to slide axially over the gearbox of the engine unit, the intake passageway is fluidly connected with the core duct, and the intake lip covers and blocks access to the scavenge duct.

The nose 60 of the inlet 18 is arranged to cover at least a portion of the gearbox 16, as shown in FIG. 6. In the illustrative embodiment, the nose 60 is configured to cover the radially outermost point 82 of the gearbox 16. The distance between the radially outermost point 82 of the gearbox 16 and the axis 34 is defined by the distance R1.

The nose 60 of the inlet 18 includes a concave forward section 84, a concave aft section 86, and an apex ring 88 defined along the boundary between the concave forward section 84 and the concave aft section 86, as shown in FIG. 6. The apex ring 88 of the nose 60 is located circumferentially along the nose 60 at the furthest radial distance from the axis 34. The concave aft section 86 includes a radially innermost point 90 that is the point on the concave aft section 86 nearest to the axis 34. The distance between the radially innermost point 90 of the concave aft section 86 and the axis 34 is defined by the distance R2. The distance R2 is greater than the distance R1 such that the radially innermost point 90 of the concave aft section 86 is located at a further radial distance from the axis than the radially outermost point 82 of the gearbox 16 to allow the inlet 18 to be translated axially over the gearbox 16.

Figure 7:
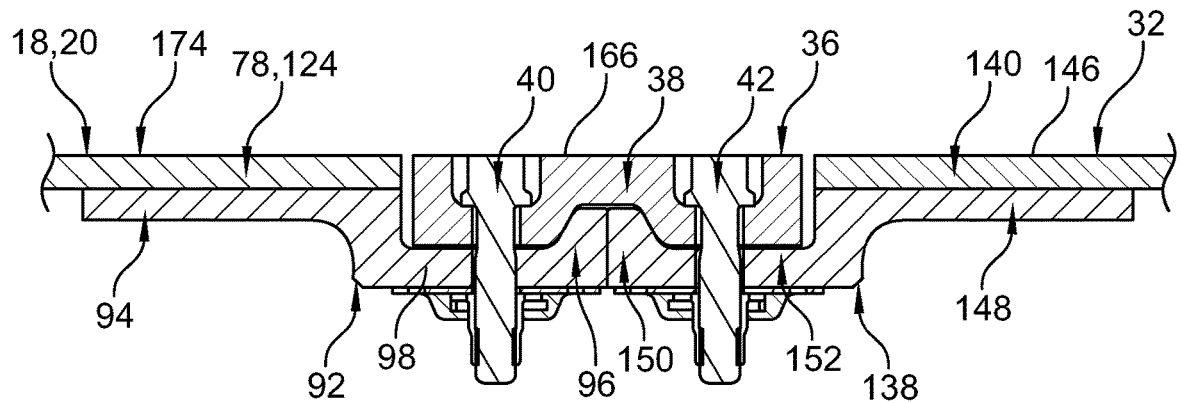
FIG. 7 is an enlarged sectional view of the dashed region of FIG. 6 showing the mounting system that couples the first inlet to the nacelle of the engine core.
Figure 8:
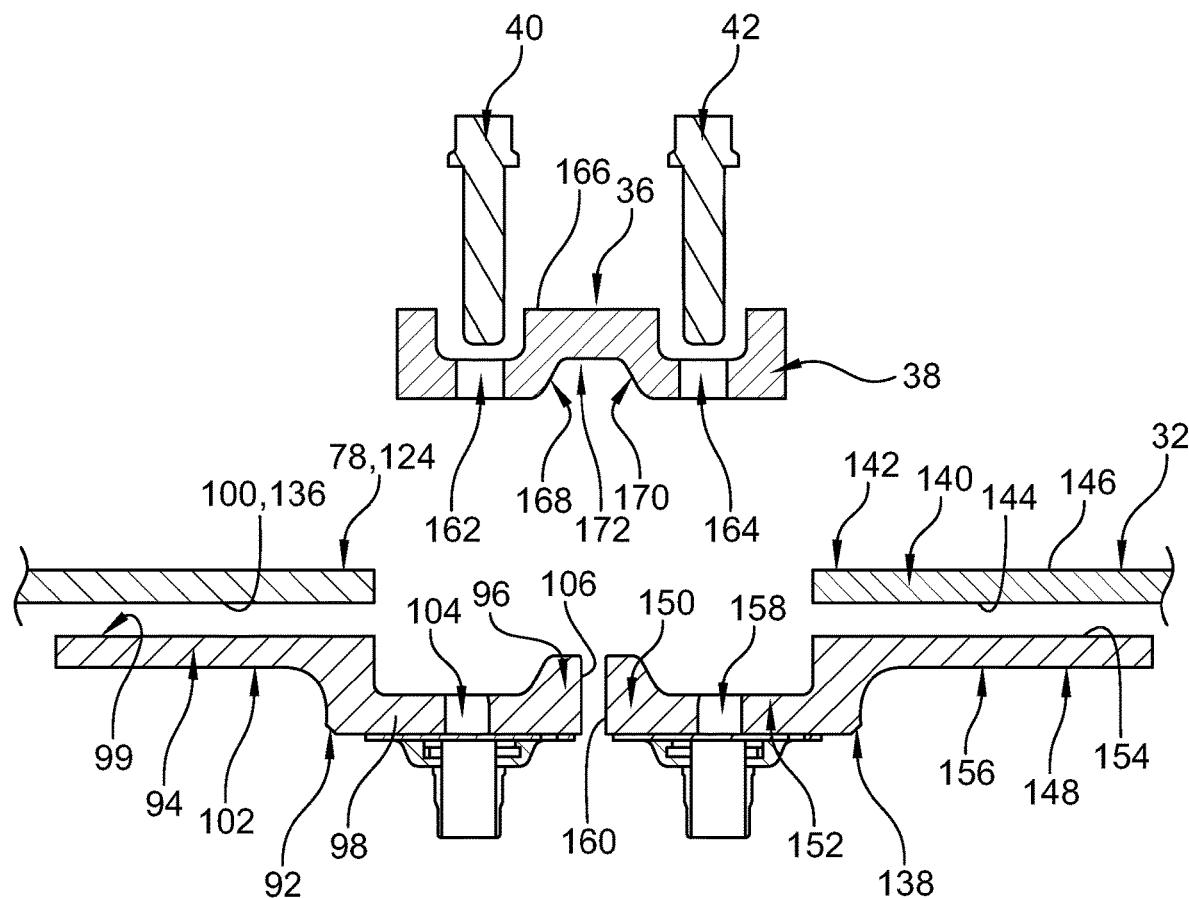
FIG. 8 is an exploded sectional view of the mounting system, the first inlet, and the nacelle of FIG. 7 showing that the mounting system includes a coupler segment having a cavity with oppositely sloped walls configured to receive a ramp of the inlet coupler and a ramp of the nacelle coupler simultaneously to clamp the first inlet with the nacelle.

The intake lip 62 includes an inlet coupler 92 located at the aft end 78 of the inlet 18, as shown in FIGS. 6 and 7. The inlet coupler 92 includes a connecting arm 94, a ramp 96, and an axially extending band 98 coupled therebetween, as shown in FIGS. 7 and 8. The connecting arm 94 includes a radially-outer surface 99 coupled to a radially inner surface 100 of the outer side 72 of the intake lip 62. In some embodiments, the connecting arm 94 is welded or brazed to the outer side 72. In some embodiments, the connecting arm 94 and the outer side 72 are integrally formed as one piece or a single monolithic component.

The axially extending band 98 of the inlet 18 is defined along a radially inner side 102 of the connecting arm 94 and extends axially aft from the connecting arm 94 to the ramp 96. The axially extending band 98 includes an aperture 104 sized and shaped to receive the first fastener 40. The ramp 96 of the inlet 18 extends radially outward and axially aft away from the axially extending band 98 of the inlet coupler 92. The ramp 96 of the inlet 18 includes an axially aft-most surface 106.

Figure 9:
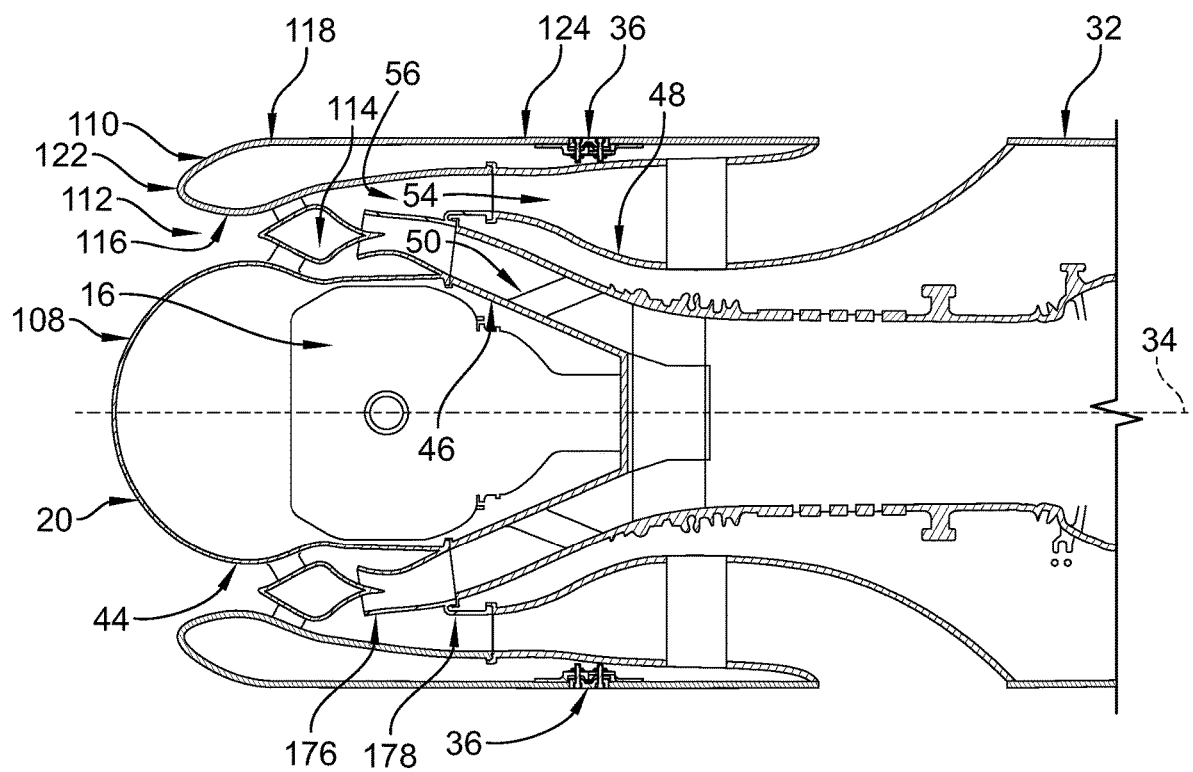
FIG. 9 is a section view of the engine unit of FIG. 1 and the second inlet having the particle separator coupled with the engine unit and showing that the inlet includes a nose arranged around the gearbox, an inlet duct coupled with the core duct to conduct clean air substantially devoid of particles into the core duct, and a scavenge duct coupled with the scavenge duct to direct scavenge air with particles suspended in the air into the scavenge duct.
Figure 11:
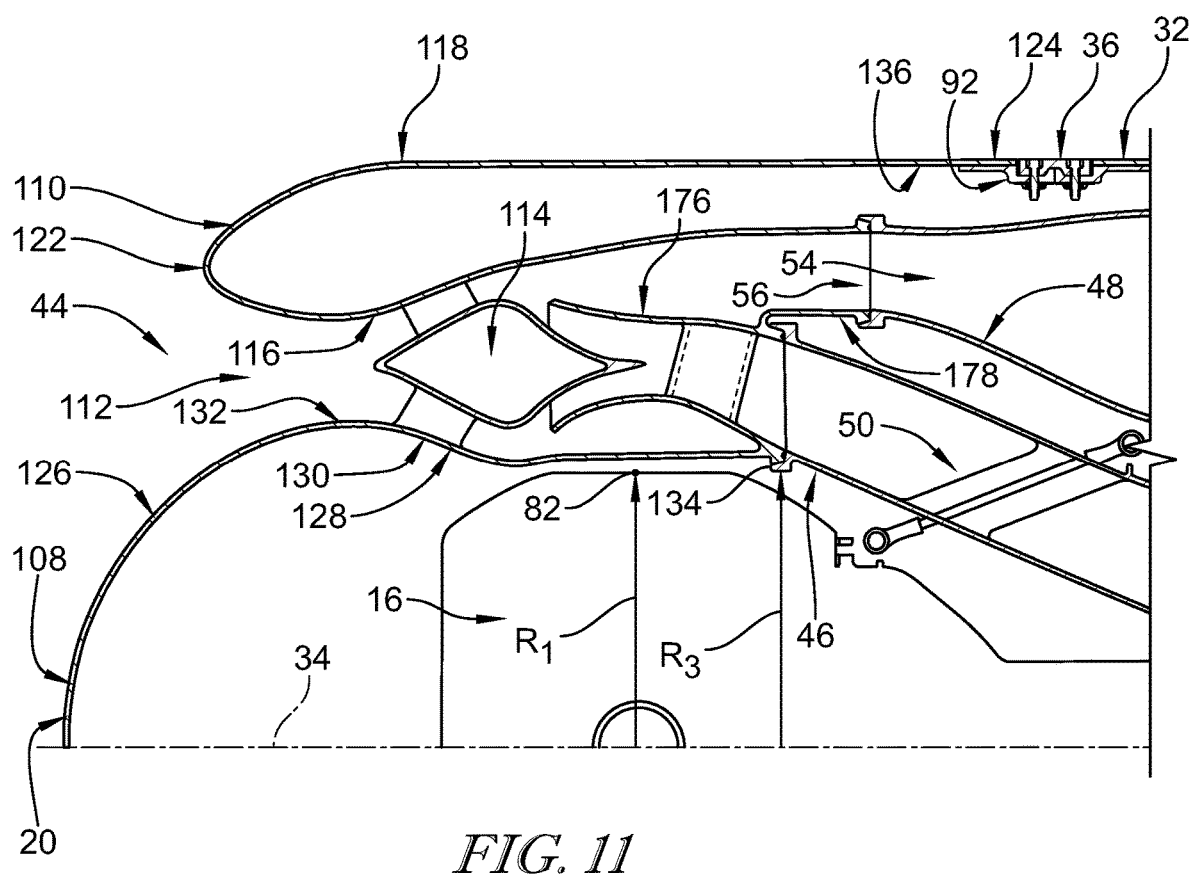
FIG. 11 is an enlarged section view of a portion of the second inlet and the engine unit of FIG. 9 showing that the nose of the inlet is sized and shaped to slide axially over the gearbox of the engine unit.

Referring now to FIGS. 9-11, the second inlet 20 is formed to comprise a particle separator and is coupled to the nacelle 32 via the mount system 36. The inlet 20 includes a nose 108 and an intake lip 110 arranged circumferentially and concentrically around the nose 108, as shown in FIGS. 9 and 10. The intake lip 110 is annular or ring shaped and the nose 108 and the intake lip 110 share a common longitudinal axis 34. The intake lip 110 and the nose 108 cooperate to define an annular intake passage 112 that extends axially through the inlet 20 and is fluidly connected with the core channel 50 and the scavenge channel 54.

The inlet 20 also includes a splitter 114 located radially between the nose 108 and the intake lip 110. The splitter 114 is configured to separate a mixture of air and particles into a clean flow substantially free of particles and a dirty flow containing the particles. The clean flow is conducted toward the core channel 50 and the dirty flow is conducted through the scavenge inlet 56 into the scavenge channel 54. Dirty flow conducted to the scavenge channel 54 may be conducted back to the environment surrounding the gas turbine engine 14.

The intake lip 110 includes a passage side 116, an outer side 118 opposite the passage side 116, and a cutout 120 that extends radially inward through the outer side 118 and through the passage side 116 of the intake lip 110, as shown in FIGS. 1 and 10. The intake lip 110 includes a curved fore end 122 connecting the passage side 116 and the outer side 118, and an aft end 124 spaced apart axially from the fore end 122. The cutout 120 extends axially forward through the aft end 124 toward the fore end 122 of the intake lip 110. The cutout 120 is sized to receive the fairing 80 that houses torque-transmitter shafts (not shown) coupled with the gearbox 16. The fairing 80 extends from the airframe 12 through the cutout 120 to the gearbox 16.

The inlet 20 further includes a clean air duct 176 and a scavenge flange 178 that extends aft of the clean air duct 176 as shown in FIG. 11. The passage side 116 of the intake lip 110 and the scavenge flange 178 engage the scavenge duct 48 to conduct dirty air with particles suspended therein into the scavenge duct 48. The clean air duct 176 is arranged to receive the clean air substantially free of particles downstream of the splitter 114 and conduct the clean air into the core duct 46. The clean air duct 176 engages the core duct 46. The clean air duct 176, the passage side 116 of the intake lip 110, and the scavenge flange 178 are held into contact with the scavenge duct 48 and the core duct 46 by the clamping force of the mount system 36. As such, fasteners are not used internal of the gas turbine engine 14 to couple the inlet 20 with the engine core 24.

The nose 108 of the inlet 20 is arranged to cover at least a portion of the gearbox 16, as shown in FIG. 11. In the illustrative embodiment, the nose 108 is configured to cover the radially outermost point 82 of the gearbox 16. The nose 108 of the inlet 20 includes a concave forward section 126, an aft section 128 having a concave portion 130, and an apex ring 132 defined along the boundary between the forward section 126 and the aft section 128. The apex ring 132 of the nose 108 is located circumferentially along the nose 108 at the furthest radial distance from the axis 34. The aft section 128 includes a radially innermost point 134 that is the point on the aft section 128 nearest to the axis 34. The distance between the radially innermost point 134 of the aft section 128 and the axis 34 is defined by the distance R3. The distance R3 is greater than the distance R1 such that the radially innermost point 134 of the aft section 128 is located at a further radial distance from the axis 34 than the radially outermost point 82 of the gearbox 16 so that the second inlet 20 may be translated axially over the gearbox 16 during assembly.

Similar to the intake lip 62 of the inlet 18, the intake lip 110 of the inlet 20 includes the inlet coupler 92 described above and shown in FIGS. 7, 8, and 11. In some embodiments, the connecting arm 94 of the inlet coupler 92 is welded or brazed to a radially inner surface 136 of the aft end 124 of the inlet 20. In some embodiments the connecting arm 94 may be coupled to the radially inner surface 136 with fasteners, such as a nut and a bolt, or with adhesives. In some embodiments, the connecting arm 94 and the aft end 124 of the inlet 20 are integrally formed as one piece or a single monolithic component.

Referring again to FIG. 7, the nacelle 32 of the engine core 24 includes a nacelle coupler 138 located at a fore end 140 of the nacelle 32. In the illustrative embodiment, the nacelle coupler 138 is a mirrored image replica of the inlet coupler 92 of the inlets 18, 20. The nacelle 32 also includes a sidewall 142 having a radially inner surface 144 and a radially outermost surface 146, as shown in FIG. 8. The nacelle coupler 138 includes a connecting arm 148, a ramp 150, and an axially extending band 152 coupled therebetween. The connecting arm 148 includes a radially outer surface 154 coupled to the radially inner surface 144 of the sidewall 142. In some embodiments, the connecting arm 148 is welded or brazed to the sidewall 142 of the nacelle 32. In some embodiments the connecting arm 148 may be coupled to the sidewall 142 with fasteners, such as a nut and a bolt, or with adhesives. In some embodiments, the connecting arm 148 and the sidewall 142 are integrally formed as one piece or a single monolithic component.

The axially extending band 152 of the nacelle coupler 138 is defined along a radially inner side 156 of the connecting arm 148 and extends axially forward from the connecting arm to 148 the ramp 150 of the nacelle coupler 138. The axially extending band 152 includes an aperture 158 sized and shaped to receive the second fastener 42. The ramp 150 of the nacelle coupler 138 extends radially outward and axially forward away from the axially extending band 152 of the nacelle coupler 138. The ramp 150 of the nacelle coupler 138 includes an axially forward-most surface 160.

The mount system 36 includes a coupler segment 38, a first fastener 40 configured to couple the coupler segment 38 to the either of inlets 18, 20, and a second fastener 42 configured to couple to the coupler segment 38 to the nacelle 32, as will be described in greater detail below. The configuration of the mount system 36 allows a mechanic or other user to access, insert, and/or remove the first fastener 40 and the second fastener 42 from the coupler segment 38 from outside the gas turbine engine 14 without disassembly of other components. The mount system 36 comprises a plurality of coupler segments and fasteners to couple the inlet 18, 20 to the engine core 24.

The coupler segment 38 of the mount system 36 includes a forward aperture 162 and an aft aperture 164 spaced axially apart from the forward aperture 162, as shown in FIG. 8. Each aperture 162, 164 extends radially outward into a radially outermost surface 166 of the coupler segment 38. The forward aperture 162 and the aft aperture 164 include counter bores or countersinks. The counter bores and countersinks extend radially inward from the radially outermost surface 166 of the coupler segment 38. The forward aperture 162 is configured to receive the first fastener 40 to couple the coupler segment 38 to the axially extending band 98 of the inlet coupler 92. The aft aperture 164 is configured to receive the second fastener 42 to couple the coupler segment 38 to the axially extending band 152 of the nacelle coupler 138.

The first fastener 40 of the mount system 36 extends radially inward through the forward aperture 162 of the coupler segment 38 and the axially extending band 98 of the inlet coupler 92. The second fastener 42 of the mount system 36 extends radially inward through the aft aperture 164 of the coupler segment 38 and the axially extending band 152 of the nacelle coupler 138. In this arrangement, the first fastener 40 and the second fastener 42 are couplable, removable, and otherwise accessible from outside the gas turbine engine 14 without disassembly of other components of the gas turbine engine 14. In some embodiments, a plurality of coupler segments 38 may be aligned circumferentially around the axis 34 and may abut one another to form a full hoop. In some embodiments, the plurality of coupler segments 38 may be aligned circumferentially around the axis 34 and spaced apart axially.

Each coupler segment 38 includes a first tapered wall 168 positioned axially aft of the forward aperture and a second tapered wall 170 positioned axially aft of the first tapered wall 168 and axially forward of the aft aperture 164. The first and second tapered walls 168, 170 have opposite slopes and extend away from one another such that the tapered walls 168, 170 define a cavity 172 that extends radially outward into the coupler segment 38.

The cavity 172 of the coupler segment 38 is sized and shaped to receive the ramp 96 of the inlet coupler 92 and the ramp 150 of the nacelle coupler 138 simultaneously, as shown in FIGS. 7 and 8. When the first fastener 40 and the second fastener 42 are inserted into each of the coupler segment 38, the inlet coupler 92, and the nacelle coupler 138, the fasteners 40, 42 may be tightened to apply a radial clamping force to the inlet coupler 92 and nacelle coupler 138. When the fasteners 40, 42 apply the radial clamping force, the tapered walls 168, 170 of the coupler segment 38 engage the ramp 96 of the inlet coupler 92 and the ramp 150 of the nacelle coupler 138 to redirect a portion of the radial clamping force in the axial direction to urge the inlet 18 or the inlet 20 axially toward the nacelle 32.

The fasteners 40, 42 may be tightened to cause the axially aft-most surface 106 of the inlet coupler 92 and the axially forward-most surface 160 of the nacelle coupler 138 to abut and exert an axial force on one another. The inlet coupler 92 abuts the nacelle coupler 138 in the axial direction without overlapping the nacelle coupler 138 in the radial direction. The nacelle coupler 138 abuts the inlet coupler 92 in the axial direction without overlapping the inlet coupler 92 in the radial direction.

Each inlet 18, 20 includes a radially outermost surface 174, and the nacelle 32 includes a radially outermost surface 146, as described above. As shown in FIG. 7, when the fasteners 40, 42 secure the coupler segment 38 to the inlet 18, 20 and to the nacelle 32, the radially outermost surface 146 of the nacelle 32 and the radially outermost surface 174 of the inlet 18, 20 are flush with the radially outermost surface 166 of the coupler segment 38. The flush arrangement of the radially outermost surfaces 174, 146, and 166 may provide improved aerodynamic efficiency for the gas turbine engine 14.

The interchangeable gas turbine engine inlet include the inlets and the members to connect the inlet to the nacelle. The inlet and engine may be used together in a helicopter application or other aircraft application. In use, an inlet is brought into position and attached to the engine. This inlet can be removed and replaced by another inlet with an additional function such as inlet particle separation. The engine is attached to the nacelle using segmented couplers. The couplers may be aligned circumferentially around the axis 34, and may abut one another to form a full hoop. The steps for an inlet replacement procedure may include: removing bolts and couplers, removing an existing inlet, moving a new inlet into position, and replacing the couplers and bolts.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A gas turbine engine comprising an engine unit that includes an engine core including a compressor, a combustor, and a turbine arranged along an axis, a core duct coupled with the compressor and formed to define a core channel configured to receive a fluid and conduct the fluid to the compressor, and a nacelle arranged circumferentially relative to the axis around at least the compressor and including a nacelle coupler located at a fore end of the nacelle, an inlet removably coupled with the nacelle and configured to conduct the fluid into the core duct of the engine unit, the inlet includes a nose and an intake lip arranged circumferentially around the nose to define an intake passage that extends axially through the inlet and is fluidly connected with the core channel, and the intake lip includes an inlet coupler located at an aft end of the inlet, and a mount system that removably couples the inlet with the nacelle to allow the inlet to be removed and replaced with a differently shaped inlet, the mount system includes a coupler segment, a first fastener, and a second fastener, the coupler segment axially overlaps a portion of the intake lip of the inlet and the nacelle, the first fastener extends radially through the coupler segment and the inlet coupler, and the second fastener extends radially through the coupler segment and the nacelle coupler such that the first fastener and the second fastener are removable and accessible from radially outside the gas turbine engine, wherein the engine core further includes a gearbox coupled with the turbine and located axially forward of the compressor, the nose of the inlet is arranged to cover at least a portion of the gearbox, and the core duct includes an inlet opening that is located radially outward of the gearbox, wherein the nose of the inlet includes a concave forward section and an aft section that includes a concave portion coupled to the concave forward section at an apex ring of the nose, and the apex ring of the nose is located along the nose at a furthest radial extent of the nose relative to the axis.

2. The gas turbine engine of claim 1, wherein the inlet coupler includes an axially extending band and a ramp that extends radially outward away from the axially extending band of the inlet coupler, the nacelle coupler includes an axially extending band and a ramp that extends radially outward away from the axially extending band of the nacelle coupler, and the coupler segment includes tapered walls that define a cavity that extends radially outward into the coupler segment, and the ramp of the inlet coupler and the ramp of the nacelle coupler are located in the cavity such that a radial clamping force applied to the inlet coupler, the nacelle coupler, and the coupler segment from the first fastener and the second fastener cause the tapered walls of the coupler segment to engage the ramp of the inlet coupler and the ramp of the nacelle coupler to redirect a portion of the radial clamping force to an axial direction and urge the inlet axially toward the nacelle.

3. The gas turbine engine of claim 2, wherein the inlet coupler abuts the nacelle coupler in the axial direction without overlapping the nacelle coupler in a radial direction.

4. The gas turbine engine of claim 2, wherein the inlet includes a radially outermost surface located at the aft end of the inlet, the nacelle includes a radially outermost surface located at the fore end of the nacelle, and the coupler segment includes a radially outermost surface that is flush with the radial outermost surface the inlet and the radial outermost surface of the nacelle.

5. The gas turbine engine of claim 4, wherein the coupler segment is formed to include at least one of a plurality of counter bores and a plurality of countersinks that extend radially inward into the radially outermost surface of the coupler segment and receive the first fastener and the second fastener.

6. The gas turbine engine of claim 1, wherein the engine unit further includes a scavenge duct that defines a scavenge channel configured to bypass a portion of the fluid around the engine core, the scavenge channel includes a scavenge inlet and a scavenge outlet located downstream of the scavenge inlet, and the intake lip is arranged around the scavenge inlet to block access to the scavenge inlet.

7. The gas turbine engine of claim 1, wherein the engine unit further includes a scavenge duct that defines a scavenge channel configured to bypass a portion of the fluid around the compressor, the inlet further includes a splitter located radially between the intake lip and the nose, the fluid conducted by the core duct of the engine unit includes a mixture of air and particles, and the splitter is configured to separate the fluid conducted by the core duct of the engine unit into a clean flow substantially free of the particles and a dirty flow containing the portion of the fluid with the particles and direct the clean flow toward the core channel and the dirty flow toward the scavenge channel.

8. The gas turbine engine of claim 1, wherein the aft section includes a radially innermost point, and the radially innermost point is located at a further radial distance from the axis than a radially outermost point of the gearbox.

9. The gas turbine engine of claim 1, wherein the intake lip incudes a tore end and an aft end spaced apart axially from the fore end and the intake lip is formed to define a cutout that extends axially from the aft end of the intake lip, at least partway toward the fore end, and the cutout is sized to receive a fairing that houses torque-transmitter shafts coupled with the gearbox.

10. A gas turbine engine comprising an engine unit that includes an engine core including a compressor, a combustor, and a turbine, a core duct coupled with the compressor and formed to define a core channel configured to conduct fluid to the compressor, a scavenge duct that defines a scavenge channel configured to bypass fluid around the engine core, and a nacelle arranged circumferentially around the compressor and the scavenge duct relative to an axis and including a nacelle coupler located at a fore end of the nacelle, and an inlet removably coupled with the nacelle and formed to include an intake lip arranged circumferentially around the axis to define an intake passage that extends axially through the inlet, the intake passage fluidly connected with the core channel, and the intake lip includes an inlet coupler located at an aft end of the inlet, wherein the scavenge duct includes a scavenge inlet and a scavenge outlet located downstream of the scavenge inlet and the intake lip is arranged around the scavenge inlet to block access to the scavenge inlet, further comprising a mount system that includes a coupler segment, a first fastener, and a second fastener, the coupler segment axially overlaps the nacelle coupler and the inlet coupler, the first fastener extends radially through the coupler segment and the inlet coupler, and the second fastener extends radially through the coupler segment and the nacelle coupler, wherein the inlet coupler includes an axially extending band and a ramp that extends radially outward away from the axially extending band of the inlet coupler, the nacelle coupler includes an axially extending band and a ramp that extends radially outward away from the axially extending band of the nacelle coupler, and the coupler segment includes tapered walls that define a cavity that extends radially outward into the coupler segment and the ramp of the inlet coupler and the ramp of the nacelle coupler are located in the cavity, wherein the inlet coupler abuts the nacelle coupler in the axial direction without overlapping the nacelle coupler in the radial direction.

11. The gas turbine engine of claim 10, wherein the engine core further includes a gearbox coupled with the turbine and located axially forward of the compressor, the inlet further includes a nose that engages the core duct, and the nose of the inlet is sized to translate axially in an aft direction over the gearbox to engage the core duct.

12. A method comprising
providing an engine unit that includes an engine core including a compressor, a combustor, and a turbine arranged along an axis, a core duct coupled with the compressor and formed to define a core channel configured to receive a fluid and conduct the fluid to the compressor, and a nacelle arranged circumferentially relative to the axis around at least the compressor, coupling a first inlet with the nacelle, the first inlet including a nose and an intake lip arranged circumferentially around the nose to define an intake passage that extends axially through the inlet, removing the first inlet from the nacelle,
coupling a second inlet with the nacelle, the second inlet being of a different shape than the first inlet,
wherein coupling the first inlet with the nacelle includes:
positioning a coupler segment of a mount system relative to the first inlet and the nacelle such that the coupler segment axially overlaps a portion of the inlet and a portion of the nacelle,
inserting a first fastener of the mount system radially through the coupler segment and through an inlet coupler located at an aft end of the inlet to couple the coupler segment to the inlet, and
inserting a second fastener of the mount system radially through the coupler segment and a nacelle coupler located at a fore end of the nacelle to couple the coupler segment to the nacelle,
wherein removing the first inlet from the nacelle includes:
accessing the first fastener from radially outside the engine unit,
removing the first fastener from the coupler segment and the inlet coupler,
accessing the second fastener from radially outside the engine unit, and
removing the second fastener from the coupler segment and the nacelle coupler.

13. The method of claim 12, wherein the engine core further incudes a gearbox coupled with the turbine and located axially forward of the compressor and radially inward of the core duct and coupling the first inlet with the nacelle includes sliding the nose of the first inlet axially aft over the gearbox of the engine core toward the nacelle.

14. The method of claim 12, wherein the engine core further includes a scavenge duct that defines a scavenge channel configured to bypass a portion of the fluid around the compressor, the scavenge duct includes a scavenge inlet and a scavenge outlet located downstream of the scavenge inlet, and coupling the first inlet with the nacelle includes positioning the intake lip of the first inlet around the scavenge inlet to block access to the scavenge inlet.

* * * * *